United States Patent [19]

Kitano

[11] Patent Number: 4,633,973
[45] Date of Patent: Jan. 6, 1987

[54] ACOUSTIC APPARATUS

[75] Inventor: Toyoaki Kitano, Muko, Japan

[73] Assignee: Mitsubishi Denki Kabushiki Kaisha, Tokyo, Japan

[21] Appl. No.: 790,364

[22] Filed: Oct. 23, 1985

[30] Foreign Application Priority Data

Oct. 25, 1984 [JP] Japan ................................. 59-225509
Apr. 3, 1985 [JP] Japan ................................. 60-70358

[51] Int. Cl.$^4$ .......................... F16F 9/10; G11B 17/00
[52] U.S. Cl. ..................................... 181/207; 248/565; 248/621; 248/636; 369/248
[58] Field of Search ..................... 181/207–209; 248/565, 621, 636; 369/247, 248, 255

[56] References Cited

U.S. PATENT DOCUMENTS

| 2,912,212 | 11/1959 | Lowe et al. | 248/621 X |
| 4,362,287 | 12/1982 | Grongs et al. | 248/565 X |
| 4,492,366 | 1/1985 | Ozawa et al. | 248/636 X |

FOREIGN PATENT DOCUMENTS

| 537823 | 7/1941 | United Kingdom. |
| 627990 | 8/1949 | United Kingdom. |
| 738925 | 10/1955 | United Kingdom. |
| 1196246 | 6/1970 | United Kingdom. |
| 1236410 | 6/1971 | United Kingdom. |
| 1399525 | 7/1975 | United Kingdom. |
| 1531874 | 11/1978 | United Kingdom. |
| 1597295 | 9/1981 | United Kingdom. |
| 2067821A | 7/1981 | United Kingdom. |
| 2115203A | 9/1983 | United Kingdom. |

Primary Examiner—Benjamin R. Fuller
Attorney, Agent, or Firm—Birch, Stewart, Kolasch & Birch

[57] ABSTRACT

A suspension mechanism for an acoustic apparatus which includes a reproduction mechanism portion and a container for containing the same. The suspension mechanism provided between the reproduction mechanism portion and the container; and the suspension mechanism includes a first elastic element for supporting the weight of the reproduction mechanism portion, and a second elastic element for absorbing vibrations transmitted to the reproduction mechanism portion.

5 Claims, 10 Drawing Figures

ACOUSTIC APPARATUS

FIELD OF THE INVENTION

The present invention relates to a suspension mechanism for an acoustic apparatus, for example, a disc player or tape deck constructed for use in a vehicle such as an automobile.

BACKGROUND OF THE INVENTION

In order to explain the background of the invention, reference will be made to FIG. 10:

In FIG. 10, the reference numeral 1 designates a player comprising a mechanism portion for reproduction 2 and a container or housing 12 for containing the mechanism portion 2. The container 12 is constituted by a chassis 5 for supporting the mechanism portion 2, a panel 4 on each end, and an upper cover 6. The numeral 7 designates a viscous and elastic member having a pillar shape and made of a viscous and elastic body such as rubber. The upper and the lower ends of the viscous-elastic member 7 are fixed to the frame 3 of the mechanism portion 2 and the chassis 5, respectively, so that elastic member 7 supports the weight of the mechanism portion 2 and absorbs the vibrations applied to the mechanism portion 2.

In this prior art acoustic apparatus, the viscous-elastic member 7 constitutes a suspension mechanism for supporting the weight of the mechanism portion 2 and absorbing the vibrations applied to the mechanism portion 2. However, the viscous-elastic member 7 has been stressed by the weight of the mechanism portion 2 before receiving any external forces such as vibrations, and therefore it cannot exhibit a sufficient damping effect when it receives stresses caused by the vibrations of an automobile. Furthermore, this elastic member 7 deteriorates with the passage of time under special circumstances, such as where there is great temperature variation as in an automobile.

SUMMARY OF THE INVENTION

The present invention is directed to solving the problems pointed out above with respect to the prior art device, and has for its object to provide an acoustic apparatus capable of absorbing the stresses caused by the movement of the vehicle, and capable of protecting the reproduction mechanism portion effectively without a deterioration of the suspension function with the passage of time even under special circumstances such as those present in a vehicle.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided an acoustic apparatus which, including a reproduction mechanism portion and a container for containing the same, comprises: a suspension mechanism provided between the reproduction mechanism portion and the container; and the suspension mechanism including a first elastic element for supporting the weight of the reproduction mechanism portion, and a second elastic element for absorbing vibrations transmitted to the reproduction mechanism portion.

DETAILED DESCRIPTION OF THE PREFERRED EMBODIMENT

Figure 10:
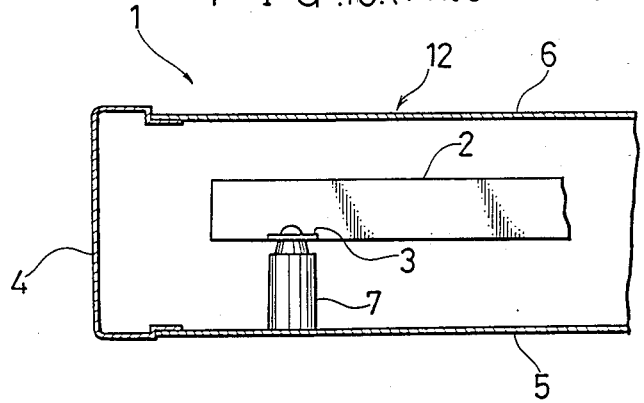
FIG. 10 is a cross-sectional view showing a prior art acoustic apparatus for use in a vehicle.

In order to explain the present invention in detail, reference will be particularly made to FIGS. 1 to 4:

FIGS. 1 to 4 are cross-sectional views showing an optical or compact disc player as a first embodiment of the present invention. In the figures the same reference numerals are used to designate the same or corresponding elements as those shown in FIG. 10.

The reference numeral 9 designates a viscous and elastic member as a second elastic member provided between the reproduction mechanism portion 2 and the chassis 5, produced in a circular pillar configuration of a viscous and elastic material such as rubber. There is produced a hollow section 9a inside of the viscous-elastic member 9. There are embedded fixing posts 10a and 10b in the upper and the lower portion of the viscous and elastic member 9, respectively. The post 10a at the upper end is fixed to the reproduction mechanism portion 2, and the post 10b at the lower end is fixed to the chassis 5.

The reference numeral 8 designates a metal coil spring as a first elastic element provided surrounding the viscous-elastic member 9. The coil spring 8 and the viscous-elastic member 9 constitute a suspension mechanism 13. This suspension mechanism 13 is preferably provided in 3 or 4 locations depending upon the weight of the reproduction mechanism portion 2.

Figure 1:
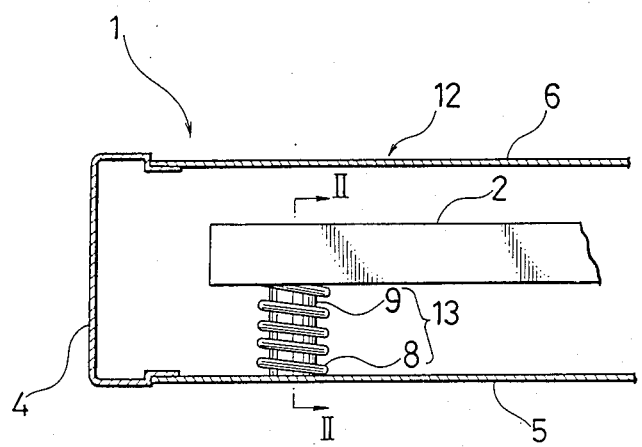
FIG. 1 is a cross-sectional view showing an acoustic apparatus for use in a vehicle as a first embodiment of the present invention.
Figure 2:
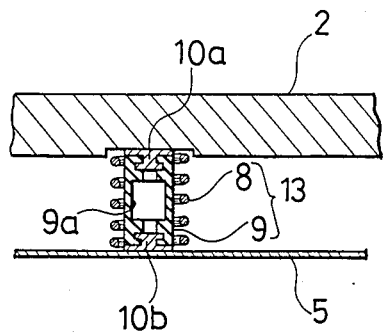
FIG. 2 is a cross sectional view on lines II—II of FIG. 1.
Figure 3:
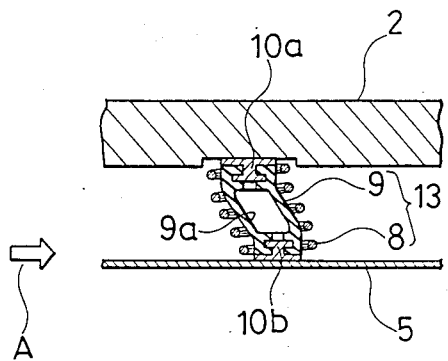
FIGS. 3 and 4 are cross-sectional views for exemplifying the operations of the first embodiment.

In this embodiment, the weight of the reproduction mechanism portion 2 is supported only by a coil spring 8, and virtually no stress is applied to the viscous-elastic member 9 when the vehicle is stationary (refer to FIG. 2). When a force A in a transverse direction is applied to the vehicle by the rolling of the vehicle in the forward-and-backward direction or leftward-and-rightward direction by rapid acceleration or rapid turning, for example the coil spring 8 and the viscous-elastic member 9 assume the positions shown in FIG. 3, thereby absorbing stresses in the horizontal direction.

Figure 4:
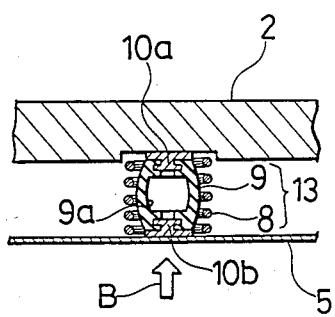
Figure 5:
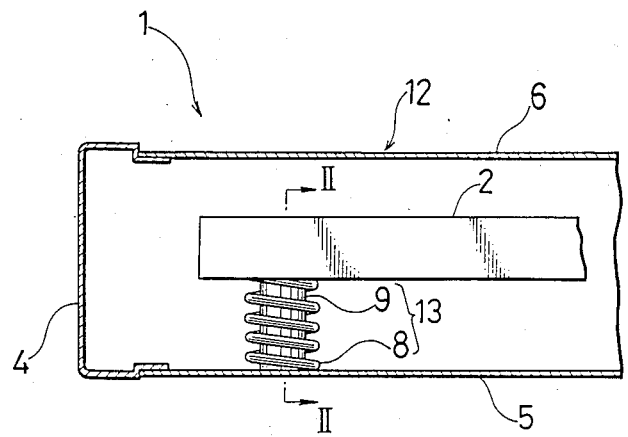
FIG. 5 is a cross-sectional view showing an acoustic apparatus for use in a vehicle as a second embodiment of the present invention.

On the other hand, when a force B in an up-and-down direction is applied to the vehicle caused by the roughness of the road, for example, as shown in FIG. 4, the coil spring 8 and the viscous-elastic member 9 assume the positions shown in the Figure, thereby absorbing stresses in the up-and-down direction.

As described above, the force applied to the player 1 is absorbed by the coil spring 8 and the viscous-elastic member 9, and the force is prevented from being transmitted to the reproduction mechanism portion 2, whereby the mechanism portion 2 is protected effectively. Meanwhile, the weight of the reproduction mechanism portion 2 scarcely acts on the viscous-elastic member 9 when the vehicle is stationary, whereby the capabilities of the suspension mechanism 13 are prevented from deteriorating with the passage of time even under special circumstances such as aboard a vehicle.

Furthermore, the viscous-elastic member 9 is surrounded by the coil spring 8 with its upper and lower end fixed, thereby enabling the regulation and positioning of the coil spring 8 without fixing it, and also utilizing the space effectively and minimizing the size of the device.

A second embodiment of the present invention will be described with reference to FIGS. 5 to 8:

FIGS. 5 to 8 are cross-sectional views showing an optical disc player as a second embodiment of the present invention. In the Figures the same reference numerals are used to designate the same or corresponding elements as those used in the first embodiment.

The reference numeral 14 designates a liquid body such as oil or grease sealed in the hollow section 9a of the viscous elastic member 9. This liquid body 14 constitutes a portion of the second elastic member.

Figure 6:
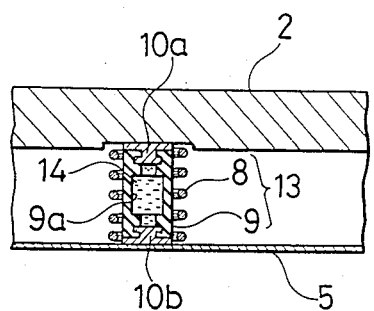
FIG. 6 is a cross-sectional view on lines II—II of FIG. 5.
Figure 7:
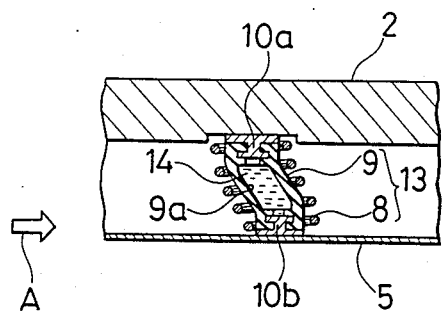
FIGS. 7 and 8 are cross-sectional views for exemplifying the operations of the second embodiment.

In this second embodiment, the weight of the reproduction mechanism portion 2 is supported by only the coil spring 8 when the vehicle is stationary, and virtually no stresses are applied to the viscous-elastic member 9 (refer to FIG. 6). When a force in a transverse direction is applied to the vehicle by the rolling of the vehicle in the forward-and-backward direction or left-and-rightward direction by a rapid acceleration or rapid turning, for example, the coil spring 8, the viscous-elastic member 9, and a liquid body 14 sealed in the hollow section 9a assume the positions shown in FIG. 6, thereby absorbing stresses in the horizontal direction.

Figure 8:
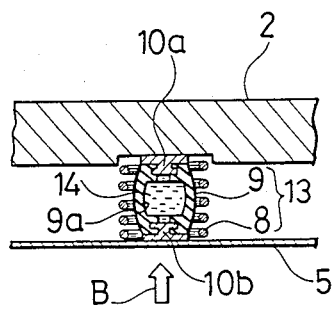
Figure 9:
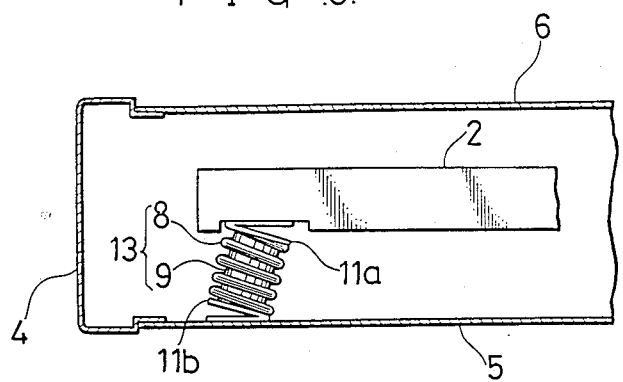
FIG. 9 is a cross-sectional view showing an alternative of the above embodiments.

On the other hand, when a force B in an up-and-downward direction is applied to the vehicle caused by the roughness of the road, for example, as shown in FIG. 8, the coil spring 8, the viscous-elastic member 9, and the liquid body 14 sealed in the hollow section 9a assume the positions shown in FIG. 8, thereby absorbing stresses in the up-and-downward direction.

As described above, the force applied to the player 1 is absorbed by the coil spring 8, the viscous-elastic member 9, and the liquid body 14 sealed in the hollow section 9a, and the force is prevented from being transmitted to the reproduction mechanism portion 2, whereby the mechanism portion 2 is protected effectively. Meanwhile, the weight of the reproduction mechanism portion 2 scarcely acts on the viscous elastic member 9 and the liquid body sealed in the hollow section 9a in the stop state of the vehicle, whereby the capabilities of the suspension mechanism 13 are prevented from deteriorating with the passage of time even under special circumstances such as aboard a vehicle. Furthermore, the liquid body 14 also absorbs stresses which arise when a force in the up-and-downward direction or left-and-rightward direction is applied thereto, thereby suppressing the deterioration with the passage of time of the viscous elastic member 9.

In the illustrated embodiment, the suspension mechanism 13 is provided vertically to the elastic member attaching surface of the reproduction mechanism portion 2, but it can be attached in a diagonal direction thereto in accordance with the direction, the kinds or the like of the vibrations of the vehicle, whereby the stresses can be absorbed more effectively.

In the illustrated embodiment, the present invention is applied to a disc player, but the present invention can be also applied to a tape recorder aboard a vehicle with an effect of enhancing the wow flutter property aboard a vehicle.

As evident from the foregoing description, according to the present invention, there are provided a first elastic element for supporting the weight of the reproduction mechanism portion and a second elastic element for absorbing vibrations applied to the reproduction mechanism portion, whereby stresses applied to the reproduction mechanism portion are effectively absorbed and the reproduction mechanism portion is effectively protected. Furthermore, the weight of the reproduction mechanism portion is not applied to the second elastic element in the stationary state, whereby the suspension mechanism withstands a long period of use.

What is claimed is:

1. An acoustic apparatus which, including a reproduction mechanism portion and a container for containing the same, comprises:
   a suspension mechanism provided between the reproduction mechanism portion and the container, said mechanism including a first elastic element and a second elastic element;
   said second elastic element comprising a pillar shaped viscous-elastic body produced to include a hollow section inside thereof;
   the upper and the lower end of said second elastic element being fixed to the reproduction mechanism portion and the contanier, respectively; and
   said first elastic element comprising a coil spring provided surrounding said second elastic element.

2. An acoustic apparatus as defined in claim 1, wherein said second elastic element is provided with an upper and lower fixing post whose one ends are provided embedded at the upper and the lower end of said second elastic element, respectively, and the other ends are fixed to the reproduction mechanism portion and the container, respectively.

3. An acoustic apparatus as defined in claim 1, wherein said first and said second elastic elements are provided in a diagonal direction between the reproduction mechanism portion and the container.

4. An acoustic apparatus which, including a reproduction mechanism portion and a container for containing the same, comprises:
   a suspension mechanism provided between the reproduction mechanism portion and the container, said mechanism including a first elastic element and a second elastic element;
   said second elastic element comprising a pillar shaped viscouse elastic body including a liquid body in a hollow section produced inside thereof;
   the upper and the lower end of said second elastic element being fixed to the reproduction mechanism portion and the container, respectively; and
   said first elastic element comprising a coil spring provided surrounding the second elastic element.

5. An acoustic apparatus as defined in claim 4, wherein said first elastic element is intended to support the weight of the reproduction mechanism portion, and said second elastic element is intended to abosrb vibrations transmitted to the reproduction mechanism portion.

* * * * *